(12) United States Patent
Lambert et al.

(10) Patent No.: US 9,264,404 B1
(45) Date of Patent: Feb. 16, 2016

(54) ENCRYPTING DATA USING TIME STAMPS

(71) Applicant: Marvell International Ltd., Hamilton (BM)

(72) Inventors: Paul A. Lambert, Mountain View, CA (US); Donald Pannell, Cupertino, CA (US)

(73) Assignee: Marvell International LTD., Hamilton (BM)

( * ) Notice: Subject to any disclaimer, the term of this patent is extended or adjusted under 35 U.S.C. 154(b) by 44 days.

(21) Appl. No.: 13/965,754

(22) Filed: Aug. 13, 2013

Related U.S. Application Data

(60) Provisional application No. 61/683,448, filed on Aug. 15, 2012.

(51) Int. Cl.
*H04L 9/32* (2006.01)
*H04L 29/06* (2006.01)
*H04L 9/06* (2006.01)

(52) U.S. Cl.
CPC .......... *H04L 63/0428* (2013.01); *H04L 9/3297* (2013.01); *H04L 63/123* (2013.01); *H04L 9/0618* (2013.01); *H04L 9/0637* (2013.01); *H04L 9/3294* (2013.01); *H04L 2463/121* (2013.01)

(58) Field of Classification Search
CPC ............. H04L 63/0428; H04L 63/123; H04L 2463/121; H04L 9/3297; H04L 9/0637; H04L 9/3263; H04L 9/3294; H04L 9/0618
See application file for complete search history.

(56) References Cited

U.S. PATENT DOCUMENTS

| | | | | |
|---|---|---|---|---|
| 7,203,962 B1* | 4/2007 | Moran | ................... | G06F 21/52 726/23 |
| 7,904,725 B2* | 3/2011 | Pavlicic | ................. | G06Q 20/02 713/155 |
| 2003/0204734 A1* | 10/2003 | Wheeler | ............... | H04L 9/0844 713/184 |
| 2004/0131014 A1* | 7/2004 | Thompson, III | ....... | H04H 60/06 370/230 |
| 2005/0058289 A1* | 3/2005 | Depta | ..................... | G06F 7/588 380/259 |
| 2005/0081039 A1* | 4/2005 | Lee | ........................ | H04L 63/045 713/176 |
| 2005/0187966 A1* | 8/2005 | Iino | ........................ | H04L 63/065 |
| 2006/0077908 A1* | 4/2006 | Park | .................. | H04L 29/12216 370/254 |
| 2006/0136715 A1* | 6/2006 | Han | ....................... | H04L 63/126 713/151 |
| 2006/0153375 A1* | 7/2006 | Yi | ........................ | H04L 63/0428 380/44 |
| 2006/0184797 A1* | 8/2006 | Weis | ..................... | H04L 63/126 713/178 |
| 2006/0190723 A1* | 8/2006 | Benson | ................. | H04L 9/0825 713/165 |

(Continued)

OTHER PUBLICATIONS

Whiting et al., Counter with CBC-MAC (CCM), Sep. 2003, Network Working Group, RFC: 3610.*

(Continued)

*Primary Examiner* — Eleni Shiferaw
*Assistant Examiner* — Nelson Giddins

(57) ABSTRACT

A system including a time stamp module, an encryption module, and a packet generator module. The time stamp module is configured to generate a time stamp for a packet. The encryption module is configured to encrypt data using the time stamp and a security key. The packet generator module is configured to generate the packet. The packet includes (i) the time stamp in a header portion of the packet, and (ii) the encrypted data in a payload portion of the packet.

14 Claims, 5 Drawing Sheets

(56) References Cited

U.S. PATENT DOCUMENTS

| | | | |
|---|---|---|---|
| 2006/0239218 A1* | 10/2006 | Weis | H04J 3/0661 370/312 |
| 2007/0189528 A1* | 8/2007 | Ueda | H04L 9/0844 380/44 |
| 2008/0232595 A1* | 9/2008 | Pietrowicz | G06Q 20/3829 380/277 |
| 2009/0204811 A1* | 8/2009 | Fries | H04L 63/123 713/160 |
| 2009/0214028 A1* | 8/2009 | Schneider | H04L 9/0844 380/44 |
| 2009/0235349 A1* | 9/2009 | Lai | H04L 9/3213 726/14 |
| 2010/0023759 A1* | 1/2010 | Langer | H04L 9/0833 713/156 |
| 2010/0049969 A1* | 2/2010 | Shon | H04L 9/0861 713/156 |
| 2010/0111308 A1* | 5/2010 | Forsberg | H04L 63/061 380/278 |
| 2010/0169645 A1* | 7/2010 | McGrew | H04L 9/0822 713/170 |
| 2010/0303229 A1* | 12/2010 | Unruh | H04L 9/0637 380/28 |
| 2010/0306527 A1* | 12/2010 | Huin | H04H 60/23 713/153 |
| 2011/0138173 A1* | 6/2011 | Okuda | H04L 9/12 713/161 |
| 2011/0149998 A1* | 6/2011 | Thompson | H04J 3/0697 370/474 |
| 2012/0008768 A1* | 1/2012 | Mundra | H04L 9/0637 380/28 |
| 2012/0166800 A1* | 6/2012 | Massicot | G07D 7/004 713/168 |
| 2013/0007471 A1* | 1/2013 | Grab | G06F 21/10 713/193 |
| 2013/0042112 A1* | 2/2013 | Spector | H04L 9/0847 713/171 |
| 2013/0170471 A1* | 7/2013 | Nix | H04W 36/00 370/331 |
| 2014/0056307 A1* | 2/2014 | Hutchison | H04L 49/552 370/394 |
| 2014/0075189 A1* | 3/2014 | Abraham | H04W 76/04 713/168 |
| 2014/0173705 A1* | 6/2014 | Manning | H04L 63/08 726/6 |
| 2014/0226820 A1* | 8/2014 | Chopra | H04L 63/0485 380/277 |
| 2014/0298035 A1* | 10/2014 | Tredoux | H04L 9/3297 713/178 |
| 2014/0331062 A1* | 11/2014 | Tewari | G06F 21/6227 713/189 |

OTHER PUBLICATIONS

Viega et al., The Use of Galois/Counter Mode (GCM) in IPsec Encapsulating Security Payload (ESP), Jun. 2005, Network Working Group, RFC: 4106.*

McGrew et al., Use of Galios Message Authentication Code (GMAC) in IPsec ESP and AH, May 2006, Network Working Group, RFC: 4543.*

Salowey et al., AES Galois Counter Mode (GCM) Cipher Suites for TLS, Aug. 2008, Network Working Group, RFC: 5288.*

Morris Dworkin, Recommendation for Block Cipher Modes of Operation: Galois/Counter Mode (GCM) and GMAC, National Institute of Standards Technology, Special Publication 800-38D.*

D. McGrew, Internet Draft, AES-GCM and AES-CCM Authenticated Encryption in Secure RPT (SRPT), Jan. 26, 2011, Network Working Group, Internet Draft.*

David McGrew, et al., "The Galois/Counter Mode of Operation (GCM)", May 31, 2005, NIST Modes of Operation process, p. 1-43.*

"Specification of the Bluetooth System" Master Table of Contents & Compliance Requirements—Covered Core Package version: 4.0; Jun. 30, 2010; 2302 Pages.

IEEE 802.11ah; IEEE 802.11-11/0035r0; Heejung Yu, Il-gy Lee, Minho Cheng, Hun Sik Kang, Sok-kuy Lee; Dated Jan. 12, 2011; 10 Pages.

IEEE 802.16; IEEE Standard for Local and Metropolitan Area Networks; Part 16: Air Interface for Broadband Wireless Access Systems: IEEE Computer Society and the IEEE Microwave Theory and Techniques Society; 2009; 2082 Pages.

IEEE 802.20; IEEE Standard for Local and Metropolitan Area Networks; Part 20: Air Interface for Mobile Broadband Wireless Access Systems Supporting Vehicular Mobility—Physical and Media Access Control Layer Specification: IEEE Computer Society; Aug. 29, 2008; 1053 Pages.

IEEE P802.11, Wireless LANs, Mar. 2012, 2793 pages.

IEEE P802.11acTM/D2.0; Draft Standard for Information Technology—Telecommunications and information exchange between systems—Local and metropolitan area networks—Specific requirements; Part 11: Wireless LAN Medium Access Control (MAC) and Physical Layer (PHY) specifications; Amendment 4: Enhancements for Very High Throughput for Operations in Bands below 6 GHz; Jan. 2012; 359 Pages.

IEEE P802.11ah / D1.0 (Amendment to IEEE Std 802.11REVmc / D1.1, IEEE Std 802.11ac / D5.0 and IEEE Std 802.11af / D3.0) Draft Standard for Information technology—Telecommunications and information exchange between systems Local and metropolitan area networks—Specific requirements; Part 11: Wireless LAN Medium Access Control (MAC) and Physical Layer (PHY) Specifications; Amendment 6: Sub 1 GHz License Exempt Operation; Prepared by the 802.11 Working Group of the LAN/MAN Standards Committee of the IEEE Computer Society; Oct. 2013; 394 pages.

IEEE Std. P802.11ad/D5.0 "Draft Standard for Information Technology—Telecommunications and information exchange between systems—Local and metropolitan area networks—Specific requirements, Part 11: Wireless LAN Medium Access Control (MAC) and Physical Layer (PHY) specifications: Amendment 3: Enhancements for Very High Throughput in the 60 GHz Band," The Institute of Electrical and Electronics Engineers, Inc., Sep. 2011.

IEEE Std 1722$^{TM}$-2011—IEEE Standard for Layer 2 Transport Protocol for Time-Sensitive Applications in Bridge Local Area Networks; IEEE Computer Society; May 6, 2011.

* cited by examiner

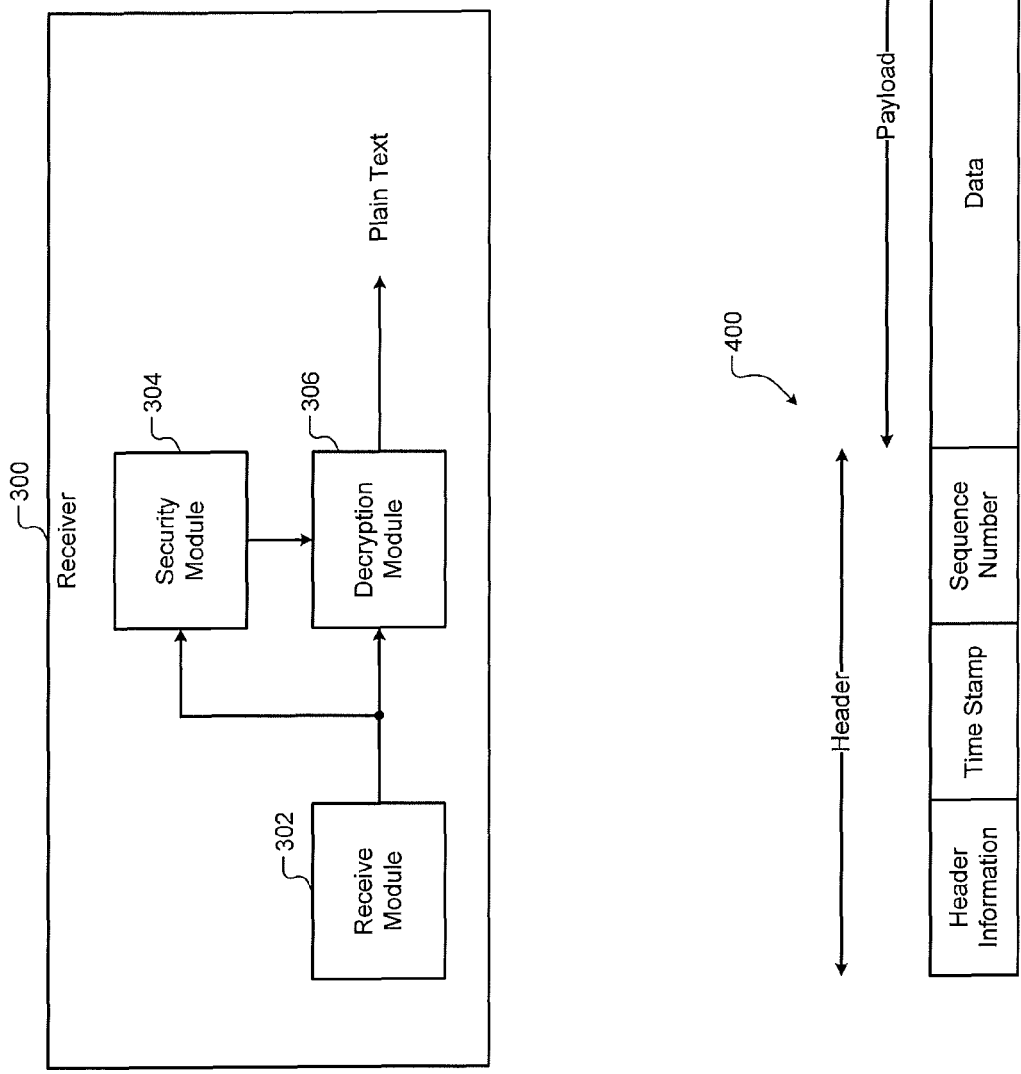

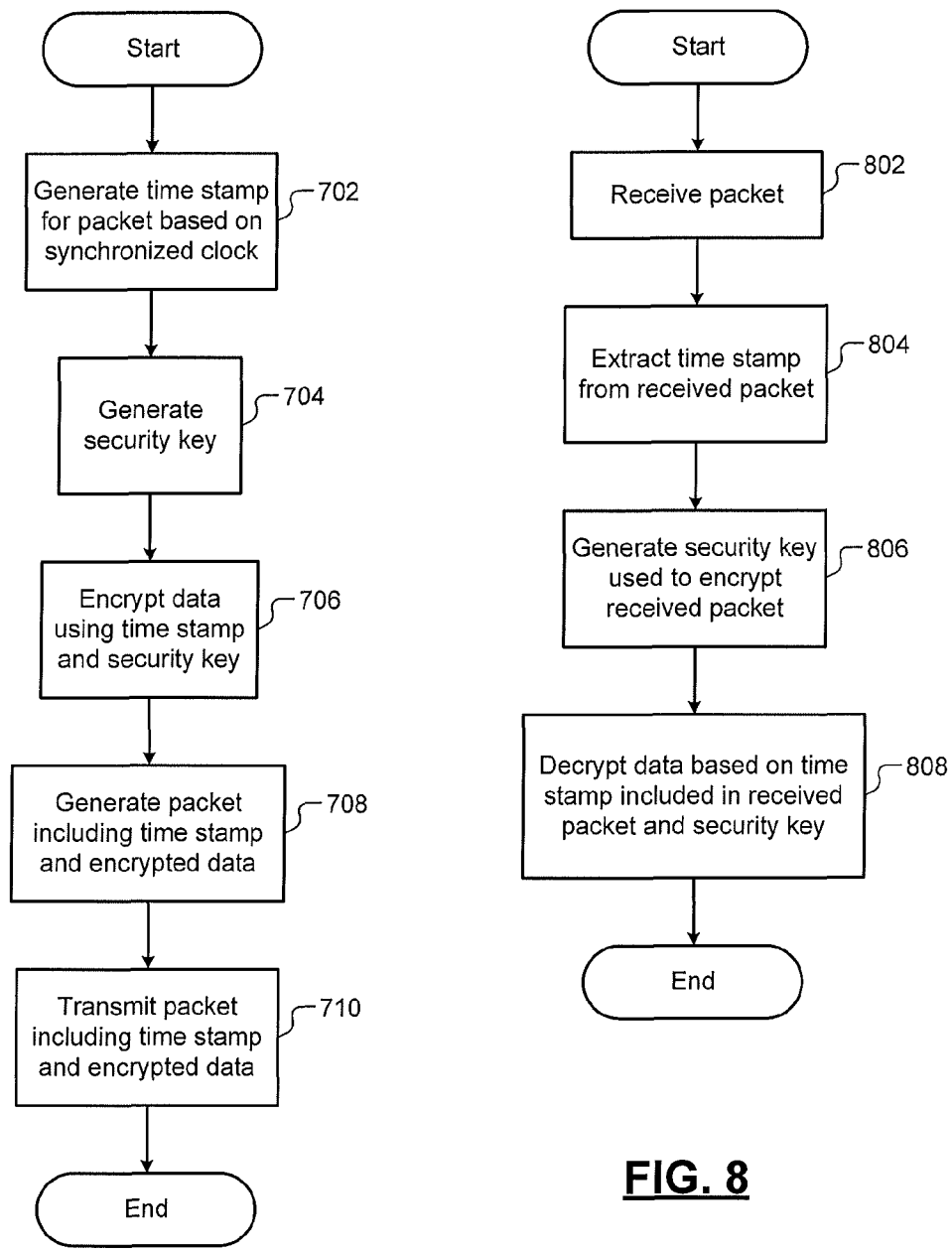

ENCRYPTING DATA USING TIME STAMPS

CROSS-REFERENCE TO RELATED APPLICATIONS

This claims the benefit of U.S. Provisional Application No. 61/683,448, filed on Aug. 15, 2012. The entire disclosure of the application referenced above is incorporated herein by reference.

FIELD

The present disclosure relates generally to communication systems and more particularly to encrypting data using time stamps.

BACKGROUND

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

The Institute of Electrical and Electronics Engineers (IEEE) has developed several 802.1X specifications that define security protocols to be followed by communication devices. Communication devices can exchange data securely when the security protocols are used to authenticate communications between the devices. The communication devices may be wired or wireless.

SUMMARY

A system comprises a time stamp module, an encryption module, and a packet generator module. The time stamp module is configured to generate a time stamp for a packet. The encryption module is configured to encrypt data using the time stamp and a security key. The packet generator module is configured to generate the packet. The packet includes (i) the time stamp in a header portion of the packet, and (ii) the encrypted data in a payload portion of the packet.

In another feature, the encryption module is configured to encrypt the data using the time stamp instead of using a nonce, a packet number, or an initialization vector.

In another feature, the packet generator is configured to generate the packet without including an initialization vector field in the header portion of the packet.

In another feature, the time stamp module is configured to not repeat the time stamp for encrypting data in a subsequent packet.

In another feature, the time stamp module is configured to generate the time stamp based on a clock. The clock is synchronized with clocks of other devices in the system.

In another feature, the encryption module is configured to encrypt the data in accordance with (i) Counter mode with Cipher-block chaining Message authentication code Protocol (CCMP) or (ii) Galois/Counter Mode Protocol (GCMP) by using the time stamp instead of using a nonce, a packet number, an initialization vector.

In another feature, the time stamp module is configured to generate the time stamp in accordance with IEEE P1722 specification.

In another feature, the system further comprises a security module configured to generate the security key based on a predetermined key. The predetermined key is pre-negotiated with a receiver configured to receive the packet.

In other features, the encryption module is configured to generate a checksum based on at least one of unencrypted and encrypted portions of the packet, and the packet generator is configured to include the checksum in the packet.

In another feature, a transmitter comprises the system and a transmit module configured to transmit the packet.

In other features, a network comprises the transmitter and a receiver. The receiver includes a receive module, a security module, and a decryption module. The receive module is configured to (i) receive the packet transmitted by the transmitter, (ii) retrieve the time stamp included in the packet, and (iii) check integrity of the time stamp and authenticate the at least one of the encrypted and unencrypted portions in the packet based on the checksum. The security module is configured to generate the security key used to encrypt the data in the packet. The decryption module is configured to decrypt the data in the packet using the time stamp and the security key.

In still other features, a method comprises generating a time stamp for a packet, encrypting data using the time stamp and a security key, generating the packet, and transmitting the packet. The packet includes (i) the time stamp in a header portion of the packet, and (ii) the encrypted data in a payload portion of the packet.

In another feature, the encrypting of the data does not include using a nonce, a packet number, or an initialization vector.

In another feature, the packet does not include an initialization vector field in the header portion of the packet.

In another feature, the method further comprises not repeating the time stamp for encrypting data in a subsequent packet.

In another feature, the method further comprises generating the time stamp based on a clock synchronized with clocks of other devices configured to receive the packet.

In another feature, the method further comprises encrypting the data in accordance with (i) Counter mode with Cipher-block chaining Message authentication code Protocol (CCMP) or (ii) Galois/Counter Mode Protocol (GCMP) by using the time stamp instead of using a nonce, a packet number, or an initialization vector.

In another feature, the method further comprises generating the time stamp in accordance with IEEE P1722 specification.

In another feature, the method further comprises generating the security key based on a predetermined key. The predetermined key is pre-negotiated with a receiver configured to receive the packet.

In other features, the method further comprises generating a checksum based on at least one of unencrypted and encrypted portions of the packet, including the checksum in the transmitted packet, receiving the packet at a receiver, retrieving the time stamp included in the packet, checking integrity of the time stamp and authenticating the at least one of the encrypted and unencrypted portions in the packet based on the checksum, generating the security key used to encrypt the data in the packet, and decrypting the data in the packet using the time stamp and the security key.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF DRAWINGS

FIG. 3 is a functional block diagram of a receiver that decrypts a packet transmitted by the transmitter shown in FIG. 2.

FIG. 4A depicts a packet of data that includes time stamp and sequence number fields and does not include a packet number field (typically called an initialization vector or IV field) in a header portion of the packet.

FIG. 7 is a flowchart of a method for transmitting a packet that includes data encrypted using a timestamp instead of a packet number.

FIG. 8 is a flowchart of a method for decrypting a packet that includes data encrypted using a timestamp instead of a packet number.

In the drawings, reference numbers may be reused to identify similar and/or identical elements.

DESCRIPTION

Security protocols used to encrypt and authenticate data include Counter mode with Cipher-block chaining Message authentication code Protocol (CCMP) and Galois/Counter Mode Protocol (GCMP). Some cryptographic algorithms used in protocols such as CCMP and GCMP require a unique nonce or an initialization vector (IV) for every security key used to encrypt and authenticate data. A pair of nonce and security key is typically used to encrypt and authenticate data. Typically, every pairwise communication requires a unique initialization vector (e.g., a unique packet number or PN) or a nonce. Including a nonce or an initialization vector (IV) in a packet, however, requires providing an extra field in the packet (e.g., up to six octets). Additionally, ensuring that each nonce or initialization vector (IV) per security key is unique can be difficult.

Some protocols such as IEEE P1722, which is a layer 2 transport protocol for time-sensitive applications in bridged local area networks, provide a universally coordinated time stamp. The time stamp can be used as an initialization vector or a nonce for algorithms such as CCMP or GCMP. Attributes of coordinated time used in the time stamp provided by protocols such as IEEE P1722 ensure that any device will never send the same time stamp twice for the same security key (not counting retransmission of the same packet). For example, the time stamp may include time and date and may therefore never repeat.

Using the time stamp instead of an additional field dedicated for a nonce or an initialization vector (IV) can save many bytes of space in packet formats. Additionally, using the time stamp instead of a nonce or an initialization vector (IV) with a security key to encrypt and authenticate data can simplify the process of association between two devices by not requiring coordination of initialization vector (IV) starting points (e.g., packet number or PN starting points) between the devices. In some implementations, instead of or in addition to the time stamp, a sequence number may be used with a security key to encrypt and authenticate data.

The approach of using time stamp can be applied to both symmetric and asymmetric algorithms. Coordinated time stamps can also be used for public key exchanges such as Diffie-Hellman exchanges that require unique inputs per session. Arbitrary device-selected time stamps may also be used if the devices can ensure that the time stamps never repeat. Coordinated time stamps are preferable where the devices have already ensured that their clocks are synchronized to some degree and that successive time stamps are always different.

Throughout the present disclosure, a packet format including a packet number is used for illustrative purposes only. The teachings of the present disclosure can be extended to other protocols that use any type of serialization or sequencing (e.g., an initialization vector or IV) to transmit data securely.

Figure 1:
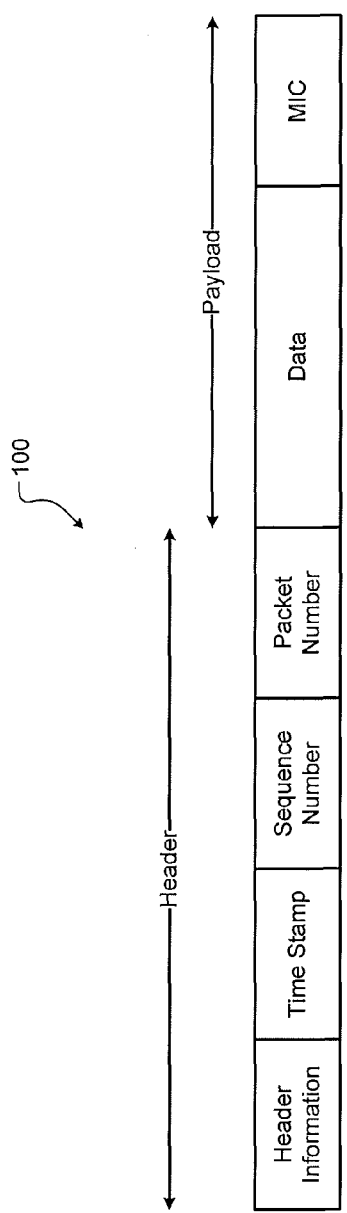
FIG. 1 depicts a packet of data including a packet number field (typically called an initialization vector or IV field) in a header portion of the packet.

FIG. 1 shows an example of a packet 100. The packet 100 includes a header portion and a payload portion. The header portion typically includes one or more fields including header information such as preamble, MAC addresses, and so on. Additionally, the header portion includes a time stamp field, a sequence number field, and a packet number field (typically called an initialization vector or IV field). A sequence number is different than a packet number (typically called an initialization vector or IV). The payload portion typically includes a data field, which includes data encrypted according to an encryption protocol such as CCMP or GCMP. The encrypted data is typically appended with a message integrity code (MIC).

Figure 2:
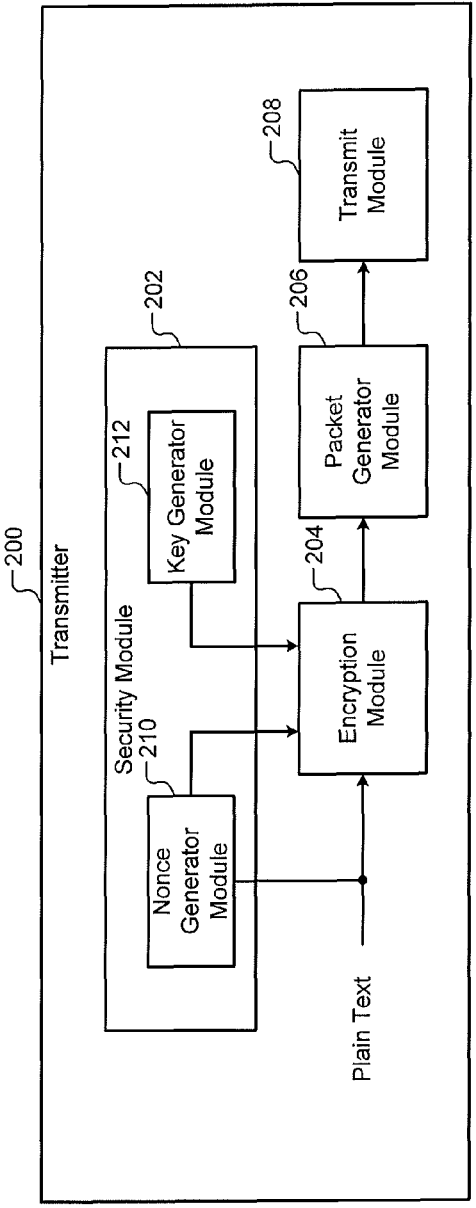
FIG. 2 is a functional block diagram of a transmitter that uses a nonce generated based on a packet number to encrypt a packet.

FIG. 2 shows a transmitter 200. The transmitter 200 includes a security module 202, an encryption module 204, a packet generator module 206, and a transmit module 208. The security module 202 includes a nonce generator module 210 and a key generator module 212. The encryption module 204 receives plain text to be encrypted. The nonce generator module 210 generates a nonce based on a packet number (typically called an initialization vector or IV) assigned to a packet that will include the encrypted data. The key generator module 212 generates a security key for encrypting the plain text. For example, the security key may include a pairwise temporal key generated based on a pairwise master key pre-negotiated between the transmitter 200 and a receiver. The nonce is unique for every temporal key used to encrypt data. That is, for a given temporal key, the nonce used to encrypt one packet is not reused to encrypt another packet.

The encryption module 204 encrypts the plain text using the nonce and the security key and generates encrypted data, which is also called cipher text. The encryption module 204 may also generate a message integrity check (MIC). The packet generator module 206 generates a packet including the nonce, the encrypted data, and the MIC as shown in FIG. 1. The transmit module 208 transmits the packet.

FIG. 3 shows a receiver 300. The receiver 300 includes a receive module 302, a security module 304, and a decryption module 306. The receive module 302 receives a packet including encrypted data transmitted by the transmitter 200. The receive module 302 verifies the identity of the transmitter

200 based on the message integrity check (MIC) in the received packet. The receive module 302 extracts the nonce from the received packet. The security module 304 generates the security key that was used to encrypt the data in the received packet. The decryption module 306 decrypts the received packet based on the nonce and the security key and recovers the plain text.

FIG. 4A shows a packet 400 according to the present disclosure. The packet 400 has a shorter header portion than the packet 100 shown in FIG. 1. Specifically, the header portion of the packet 400 does not include a packet number field (typically called an initialization vector or IV field). Accordingly, the packet 400 can carry more data in the payload portion than the packet 100 shown in FIG. 1. The time stamp field of the packet 400 includes a time stamp generated based on a synchronized clock. The synchronized clock ensures that each time stamp is unique and different. In some implementations, arbitrary time stamps may be used if it can be ensured that the time stamps will never repeat (i.e., each time stamp will be different).

Figure 4B:
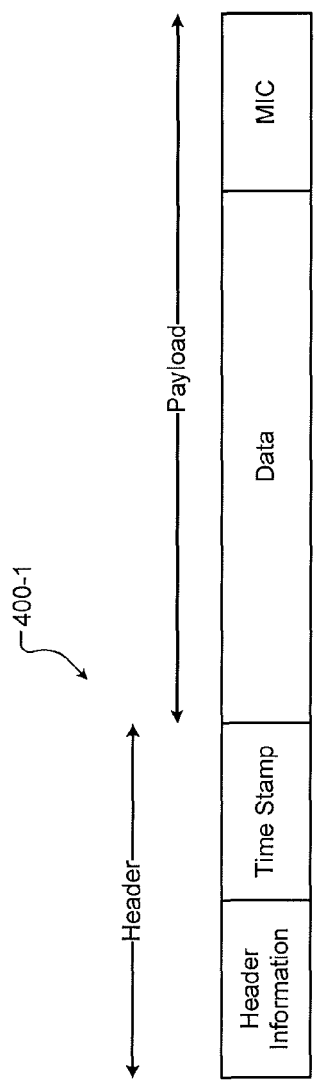
FIG. 4B depicts a packet of data that includes a time stamp field and does not include a sequence number field and a packet number field (typically called an initialization vector or IV field) in a header portion of the packet.
Figure 4C:
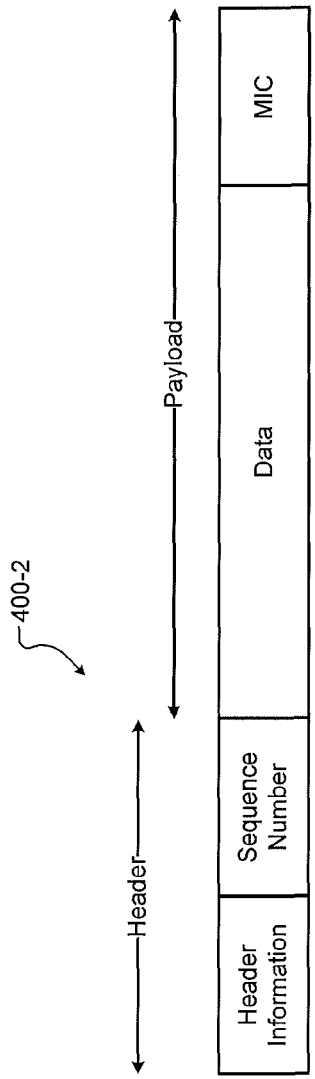
FIG. 4C depicts a packet of data that includes a sequence number field and does not include a time stamp field and a packet number field (typically called an initialization vector or IV field) in a header portion of the packet.

FIGS. 4B and 4C respectively show alternative packet formats 400-1 and 400-2 according to the present disclosure. Packet 400-1 includes only the time stamp and does not include the sequence number. Using the packet 400-1, the time stamp can be used to encrypt and authenticate data. Packet 400-2 includes only the sequence number and does not include the time stamp. Using the packet 400-2, the sequence number, which is different than a packet number (typically called an initialization vector or IV), can be used to encrypt and authenticate data. In some implementations, instead of or in addition to the time stamp, the sequence number can be used with the security key to encrypt and authenticate data. The time stamp and the sequence number are unique and different for each packet. The time stamp and the sequence number never repeat. The time stamp and the sequence number for one packet are not the same as the time stamp and the sequence number for another packet.

Figure 5:
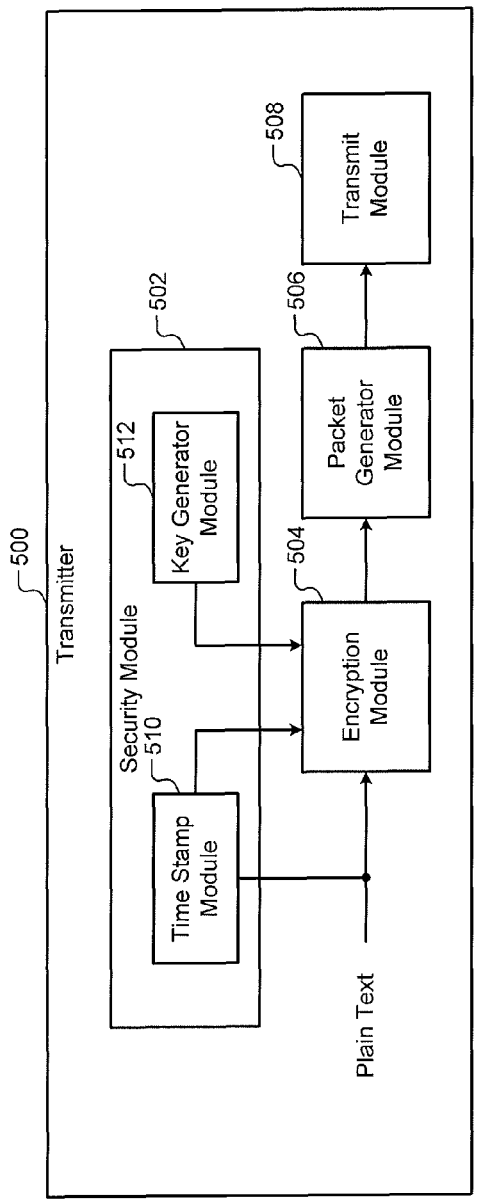
FIG. 5 is a functional block diagram of a transmitter that uses a timestamp instead of a packet number to encrypt a packet.

FIG. 5 shows a transmitter 500 according to the present disclosure. The transmitter 500 includes a security module 502, an encryption module 504, a packet generator module 506, and a transmit module 508. The security module 502 includes a time stamp module 510 and a key generator module 512. The encryption module 504 receives plain text to be encrypted. The time stamp module 510 generates a time stamp for a packet in which encrypted data will be transmitted. The time stamp module 510 generates the time stamp based on a clock that is synchronized between the transmitter 500 and a receiver. The synchronized clock ensures that each time stamp is unique and different. In some implementations, the time stamp module 510 may generate an arbitrary time stamp that will never repeat (i.e., each time stamp will be different).

The key generator module 512 generates a security key for encrypting the plain text. For example, the security key may include a pairwise temporal key generated based on a pairwise master key pre-negotiated between the transmitter 500 and a receiver. The time stamp is unique for every temporal key used to encrypt data. That is, for a given temporal key, the time stamp used to encrypt one packet is not reused to encrypt another packet. In other words, for a given temporal key, the time stamp used to encrypt one packet is different than the time stamp used to encrypt another packet.

The encryption module 504 encrypts the plain text using the time stamp and the security key and generates encrypted data, which is also called cipher text. The encryption module 504 may also generate a message integrity check (MIC). The packet generator module 506 generates a packet including the time stamp, the encrypted data, and the MIC as shown in FIG. 4. The packet does not include a packet number field (typically called an initialization vector or IV) in the header portion of the packet. The transmit module 208 transmits the packet. In some implementations, the encryption module 504 may use a sequence number, instead of or in addition to the time stamp, to encrypt the plain text.

In some implementations, the encryption module 504 may also generate a checksum or equivalent data for at least one of an unencrypted portion (e.g., the header portion) and the encrypted portions of the packet being transmitted. The checksum or the equivalent data can be included in the transmitted packet and can be used during an integrity check performed at the receiver to authenticate at least one of the unencrypted and encrypted portions of the packet being transmitted. The integrity check implicitly checks the integrity of the time stamp, thus providing a secure time stamp. Specifically, the checksum or the equivalent data includes the time stamp used to generate the transmitted packet. Accordingly, if the time stamp is tampered or breached during transmission, the integrity check of the checksum or the equivalent data fails at the receiver, and the received packet can be discarded as malicious.

Figure 6:
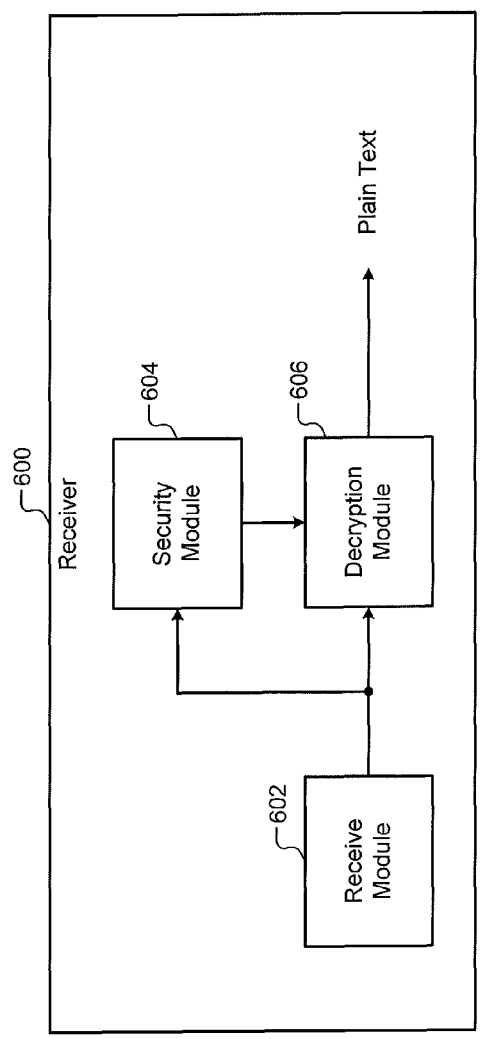
FIG. 6 is a functional block diagram of a receiver that decrypts a packet transmitted by the transmitter shown in FIG. 5.

FIG. 6 shows a receiver 600 according to the present disclosure. The receiver 600 includes a receive module 602, a security module 604, and a decryption module 606. The receive module 602 receives a packet including encrypted data transmitted by the transmitter 500. The receive module 602 verifies the identity of the transmitter 500 based on the message integrity check (MIC) in the received packet. The receive module 602 also performs the integrity check of the checksum or equivalent data as described above. The receive module 602 retrieves the time stamp (and/or the sequence number) from the received packet. The security module 604 generates the security key that was used to encrypt the data in the received packet. The decryption module 606 decrypts the received packet based on the time stamp (and/or the sequence number) and the security key and recovers the plain text.

Using the time stamp (and/or the sequence number) instead of an additional field dedicated for a nonce or an initialization vector (IV) frees up space in the packet. The freed up space can be utilized to pack additional data or other fields/features in the packet. Additionally, using the time stamp (and/or the sequence number) instead of a nonce or an initialization vector (IV) to encrypt data simplifies the process of association between the transmitter 500 and the receiver 600 by not requiring coordination of sequence number starting points between the transmitter 500 and the receiver 600.

FIG. 7 shows a method 700 for encrypting data according to the present disclosure. At 702, control generates a time stamp based on a synchronized clock. At 704, control generates a security key. At 706, control encrypts plain text using the time stamp (and/or the sequence number) and the security key. At 708, control generates a packet including the time stamp (and/or the sequence number) and the encrypted data. The packet does not include a packet number field (typically called an initialization vector or IV filed) in the header portion of the packet. Control may also generate a checksum or equivalent data that can be used by the receiver to check the integrity of the time stamp and to authenticate at least one of the unencrypted and encrypted portions of the packet. At 710, control transmits the packet including the time stamp (and/or the sequence number), the encrypted data, and the checksum or the equivalent data. Control generates a different time stamp (and/or a sequence number) to encrypt data in each subsequent packet.

FIG. 8 shows a method 800 for decrypting a packet that is encrypted according to the present disclosure. At 802, control receives a packet encrypted according to the present disclosure. At 804, control extracts a time stamp (and/or a sequence number) included in the received packet. Control may also check the integrity of the time stamp and authenticate at least one of the unencrypted and encrypted portions of the packet using the checksum or the equivalent data. At 806, control generates the security key that was used to encrypt the received packet. At 808, control decrypts the encrypted data in the received packet using the time stamp (and/or the sequence number) retrieved from the received packet and the security key. The teachings of the present disclosure can also be used in some WiFi protocols.

The communications described in the present disclosure can be conducted in full or partial compliance with IEEE standard 802.11-2012, IEEE standard 802.16-2009, IEEE standard 802.20-2008, IEEE standard P1722, and/or Bluetooth Core Specification v4.0. In various implementations, Bluetooth Core Specification v4.0 may be modified by one or more of Bluetooth Core Specification Addendums 2, 3, or 4. In various implementations, IEEE 802.11-2012 may be supplemented by draft IEEE standard 802.11ac, draft IEEE standard 802.11ad, and/or draft IEEE standard 802.11ah.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. As used herein, the phrase at least one of A, B, and C should be construed to mean a logical (A or B or C), using a non-exclusive logical OR. It should be understood that one or more steps within a method may be executed in different order (or concurrently) without altering the principles of the present disclosure.

In this application, including the definitions below, the term module may be replaced with the term circuit. The term module may refer to, be part of, or include an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor (shared, dedicated, or group) that executes code; memory (shared, dedicated, or group) that stores code executed by a processor; other suitable hardware components that provide the described functionality; or a combination of some or all of the above, such as in a system-on-chip.

The term code, as used above, may include software, firmware, and/or microcode, and may refer to programs, routines, functions, classes, and/or objects. The term shared processor encompasses a single processor that executes some or all code from multiple modules. The term group processor encompasses a processor that, in combination with additional processors, executes some or all code from one or more modules. The term shared memory encompasses a single memory that stores some or all code from multiple modules. The term group memory encompasses a memory that, in combination with additional memories, stores some or all code from one or more modules. The term memory may be a subset of the term computer-readable medium. The term computer-readable medium does not encompass transitory electrical and electromagnetic signals propagating through a medium, and may therefore be considered tangible and non-transitory. Non-limiting examples of a non-transitory tangible computer readable medium include nonvolatile memory, volatile memory, magnetic storage, and optical storage.

The apparatuses and methods described in this application may be partially or fully implemented by one or more computer programs executed by one or more processors. The computer programs include processor-executable instructions that are stored on at least one non-transitory tangible computer readable medium. The computer programs may also include and/or rely on stored data.

What is claimed is:

1. A system comprising:
   a time stamp module configured to generate a time stamp for a packet;
   a key generator module configured to generate a security key, wherein the security key is separate and distinct from the time stamp;
   an encryption module configured to
      receive the time stamp from the time stamp module;
      receive the security key from the key generator module; and
      encrypt data in accordance with (i) Counter mode with Cipher-block chaining Message authentication code Protocol (CCMP) or (ii) Galois/Counter Mode Protocol (GCMP) using (i) the time stamp instead of using an initialization vector as specified in CCMP or GCMP; and (ii) the security key; and
   a packet generator module configured to generate the packet,
   wherein the packet includes (i) the time stamp in a header portion of the packet, and (ii) the encrypted data in a payload portion of the packet, and
   wherein the packet generator is configured to generate the packet without including an initialization vector field in the header portion of the packet.

2. The system of claim 1, wherein the time stamp module is configured to not repeat the time stamp for encrypting data in a subsequent packet.

3. The system of claim 1, wherein the time stamp module is configured to generate the time stamp based on a clock, and wherein the clock is synchronized with clocks of other devices in the system.

4. The system of claim 1, wherein the time stamp module is configured to generate the time stamp in accordance with IEEE P1722 specification.

5. The system of claim 1, wherein the key generator module is configured to generate the security key based on a predetermined key, wherein the predetermined key is pre-negotiated with a receiver configured to receive the packet.

6. The system of claim 1, wherein:
   the encryption module is configured to generate a checksum based on at least one of unencrypted and encrypted portions of the packet, and
   the packet generator is configured to include the checksum in the packet.

7. A transmitter comprising:
   the system of claim 6; and
   a transmit module configured to transmit the packet.

8. A network comprising:
   the transmitter of claim 7; and
   a receiver including
      a receive module configured to (i) receive the packet transmitted by the transmitter, (ii) retrieve the time stamp included in the packet, and (iii) check integrity of the time stamp and authenticate the at least one of the unencrypted and encrypted portions of the packet based on the checksum;

a security module configured to generate the security key used to encrypt the data in the packet; and a decryption module configured to decrypt the data in the packet using the time stamp and the security key.

9. A method comprising:

generating a time stamp for a packet;

generating a security key, wherein the security key is separate and distinct from the time stamp;

receiving the time stamp separately from the security key;

encrypting data in accordance with (i) Counter mode with Cipher-block chaining Message authentication code Protocol (CCMP) or (ii) Galois/Counter Mode Protocol (GCMP) using the (i) time stamp instead of using an initialization vector as specified in CCMP or GCMP; and (ii) the security key;

generating the packet, wherein the packet includes (i) the time stamp in a header portion of the packet, and (ii) the encrypted data in a payload portion of the packet, and wherein the packet does not include an initialization vector field in the header portion of the packet; and transmitting the packet.

10. The method of claim 9, further comprising not repeating the time stamp for encrypting data in a subsequent packet.

11. The method of claim 9, further comprising generating the time stamp based on a clock synchronized with clocks of other devices configured to receive the packet.

12. The method of claim 9, further comprising generating the time stamp in accordance with IEEE P1722 specification.

13. The method of claim 9, further comprising generating the security key based on a predetermined key, wherein the predetermined key is pre-negotiated with a receiver configured to receive the packet.

14. The method of claim 9, further comprising:

generating a checksum based on at least one of unencrypted and encrypted portions of the packet;

including the checksum in the transmitted packet;

receiving the packet at a receiver;

retrieving the time stamp included in the packet;

checking integrity of the time stamp and authenticating the at least one of the unencrypted and encrypted portions in the packet based on the checksum;

generating the security key used to encrypt the data in the packet; and decrypting the data in the packet using the time stamp and the security key.

\* \* \* \* \*